(No Model.)
E. T. MARTIN.
THILL COUPLING.
No. 578,306.  Patented Mar. 2, 1897.
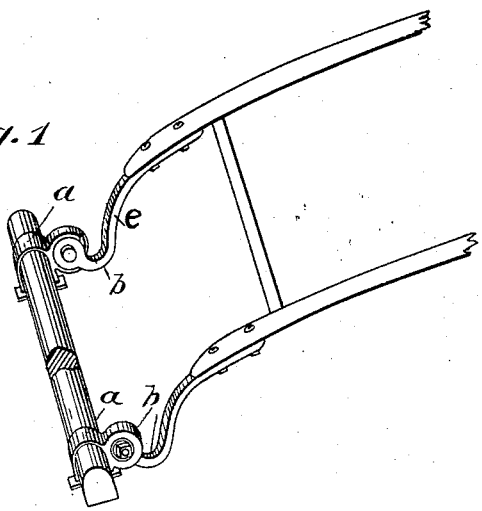
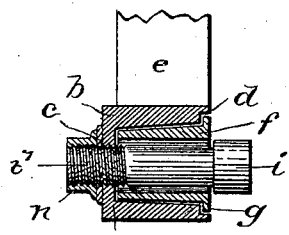
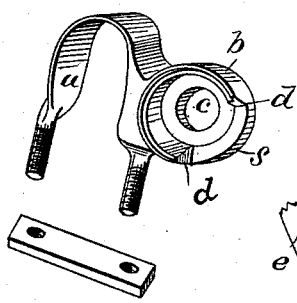
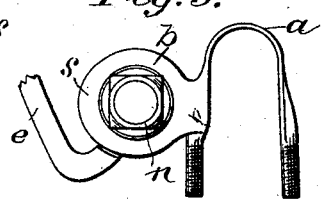
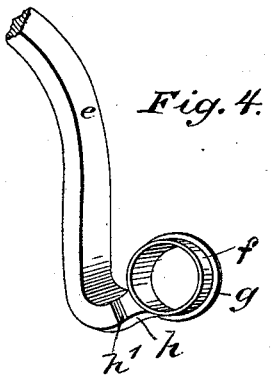
Witnesses:
M. W. Twitchell.
C. S. Watton
Inventor:
Edson T. Martin
By T. J. Gisler
Attorney.

United States Patent Office.

EDSON T. MARTIN, OF PORTLAND, OREGON, ASSIGNOR OF TWO-THIRDS TO
J. W. FOSTER AND JOSEPH DELSMAN, OF SAME PLACE.

THILL-COUPLING.

SPECIFICATION forming part of Letters Patent No. 578,306, dated March 2, 1897.

Application filed November 28, 1893. Serial No. 492,280. (No model.)

*To all whom it may concern:*

Be it known that I, EDSON T. MARTIN, a citizen of the United States, residing at Portland, Multnomah county, State of Oregon, have invented a new and useful Improvement in Thill-Couplings, of which the following is a specification, reference being had to the accompanying drawings, forming a part thereof.

The object of my invention is to obtain a safe thill-coupling; one that is strong and durable and which does not rattle; and, further, to provide means for supporting the shafts in an upright position when the vehicle is not in use. These features I attain in my invention.

The construction of my thill-coupling is illustrated in the accompanying drawings, in which—

Figure 1 is a partial perspective view of the fore axle of a vehicle with shafts coupled thereto by means of my invention. Fig. 2 shows that part of my invention which is fastened on the fore axle. Fig. 3 shows a side elevation of my coupling. Fig. 4 shows that part of my thill-coupling which is fastened to the shafts, and Fig. 5 shows a transverse section of the above-mentioned separate parts or thill-irons coupled with each other.

The letters designate the parts referred to in the description herein contained.

In the practical use of my invention right and left thill-couplings will be used.

That part of my invention which is affixed to the fore axle consists, as represented in Figs. 2 and 3, of a clip $a$ and a thimble bearing or socket $b$, which I will hereinafter term the "outer" thimble. The clip $a$ is secured to the fore axle by the usual means. The outer thimble $b$ has a threaded aperture $c$ and shoulders $d$, formed by cutting away part of the wall to permit a limited movement of the inner thimble. (Seen in Fig. 4.) The latter consists of the iron $e$ for fastening the same on the shaft, and a tapering thimble or bearing $f$, with a flange $g$ around its widest end, a section of the iron $e$ at the point $h$ where it connects with the thimble $f$ being removed to adapt this part, which I will term the "inner" thimble, to be inserted in the said outer thimble. When the inner thimble has been inserted in the outer, the former will bear in the latter, as illustrated in Fig. 5. There being right and left couplings, the outer thimble-irons are attached to the fore axle so that their mouths will face each other. The inner thimbles, attached to the shaft, are inserted in the outer thimbles by springing the shafts together. When this is inserted, the respective thimbles would retain their bearing without further means being provided. To secure the thimbles firmly together, I use a bolt $i$, having a smaller central part and threaded end, which is screwed in the threaded aperture $c$ of the outer thimble, and finally a lock-nut $n$ is screwed on the projecting threaded end $i'$ of such bolt $i$. The cut-away portions of the shoulders $d$ are preferably limited, so that the bolt receives very little of the strain on my thill-coupling, but merely retains the thimbles in their bearing.

A rawhide washer may be inserted between the outer and inner thimbles, at $w$, to allow for a "take-up," to compensate for wear.

The periphery of the outer thimble has a swelling at $s$, (see Fig. 2,) so that as the shafts and with them the irons $e$ are lowered the shoulder $h'$ of such iron $e$ jams against said swelling $s$ and lower shoulders $d$ and causes the inner thimble to bind with the outer, and thus support the shafts in a raised position.

Having thus described my invention, what I claim is as follows:

1. A clip with a boss thereon, said boss having a socket-bearing with a segmental notch cut in the wall thereof, and a cam-face adjacent to the notch, in combination with a thill-iron having a hollow bearing fitting into the socket-bearing and notched adjacent to the hollow bearing to form a neck and shoulder, said neck having movement in the segmental notch and the shoulder riding on the cam-face.

2. A thill-coupling comprising a clip with a boss thereon, said boss having a recessed socket-bearing, a cam-face and segmental notch, a thill-iron having a hollow bearing, a shoulder fitting the recess, a neck having movement in the segmental notch, and a bolt for securing the parts together.

In testimony whereof I have hereunto set my signature in the presence of two witnesses.

EDSON T. MARTIN.

Witnesses:
T. J. GEISLER,
JOSEPH DELSMAN.